United States Patent
Amemiya

(10) Patent No.: US 10,002,624 B1
(45) Date of Patent: Jun. 19, 2018

(54) MAGNETIC DISK DEVICE USING HEAD AMPLIFIER CIRCUIT FOR PATTERN DEPENDENT WRITE

(71) Applicant: Kabushiki Kaisha Toshiba, Minato-ku, Tokyo (JP)

(72) Inventor: Yoshihiro Amemiya, Chigasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/680,343

(22) Filed: Aug. 18, 2017

(30) Foreign Application Priority Data

Mar. 1, 2017 (JP) .................................. 2017-038346

(51) Int. Cl.
*G11B 5/02* (2006.01)
*G11B 5/09* (2006.01)
*G11B 5/012* (2006.01)
*G11B 5/00* (2006.01)

(52) U.S. Cl.
CPC ................ *G11B 5/09* (2013.01); *G11B 5/012* (2013.01); *G11B 5/02* (2013.01); *G11B 2005/0016* (2013.01); *G11B 2005/0018* (2013.01)

(58) Field of Classification Search
None
See application file for complete search history.

(56) References Cited

U.S. PATENT DOCUMENTS

| | | | |
|---|---|---|---|
| 7,154,687 B2 * | 12/2006 | Ikekame | G11B 5/012 360/46 |
| 8,792,197 B1 | 7/2014 | Wilson et al. | |
| 8,929,013 B1 * | 1/2015 | Mastrocola | G11B 20/10222 360/46 |
| 9,064,539 B1 * | 6/2015 | O'Brien | G11B 20/10222 |
| 9,715,887 B2 * | 7/2017 | Wilson | G11B 5/09 |
| 9,721,588 B2 * | 8/2017 | Windler | G11B 5/09 |
| 9,754,610 B2 * | 9/2017 | Wilson | G11B 20/10027 |
| 9,805,759 B1 * | 10/2017 | Kishino | G11B 20/10222 |
| 2003/0234997 A1 | 12/2003 | Ikekame et al. | |
| 2013/0128375 A1 * | 5/2013 | Livshitz | G11B 5/02 360/48 |
| 2015/0213813 A1 | 7/2015 | Lammers et al. | |

* cited by examiner

*Primary Examiner* — Tan X Dinh
(74) *Attorney, Agent, or Firm* — White & Case LLP

(57) ABSTRACT

According to one embodiment, a magnetic disk device includes a disk, a head configured to write data to the disk, and an integrated circuit configured to acquire a detection signal indicative of a first pattern of a first frequency of write data, change a first current of a second pattern of a write current corresponding to the first pattern on the basis of the detection signal, detect a third pattern of a second frequency which is greater than the first frequency from the write data, change a second current of a fourth pattern of the write current corresponding to the third pattern, and output the write current with the changed first current and the changed second current to the head.

20 Claims, 12 Drawing Sheets

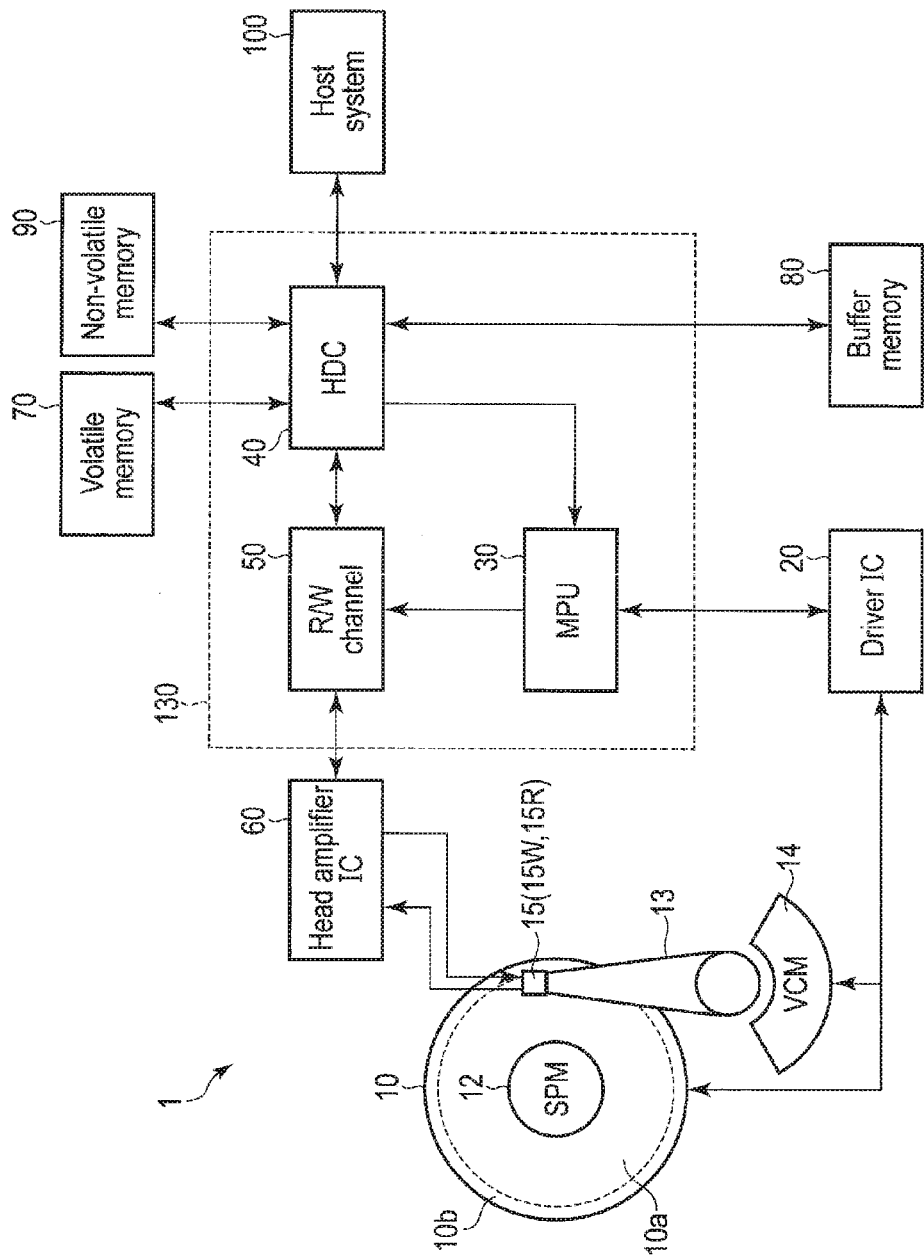
F I G. 1

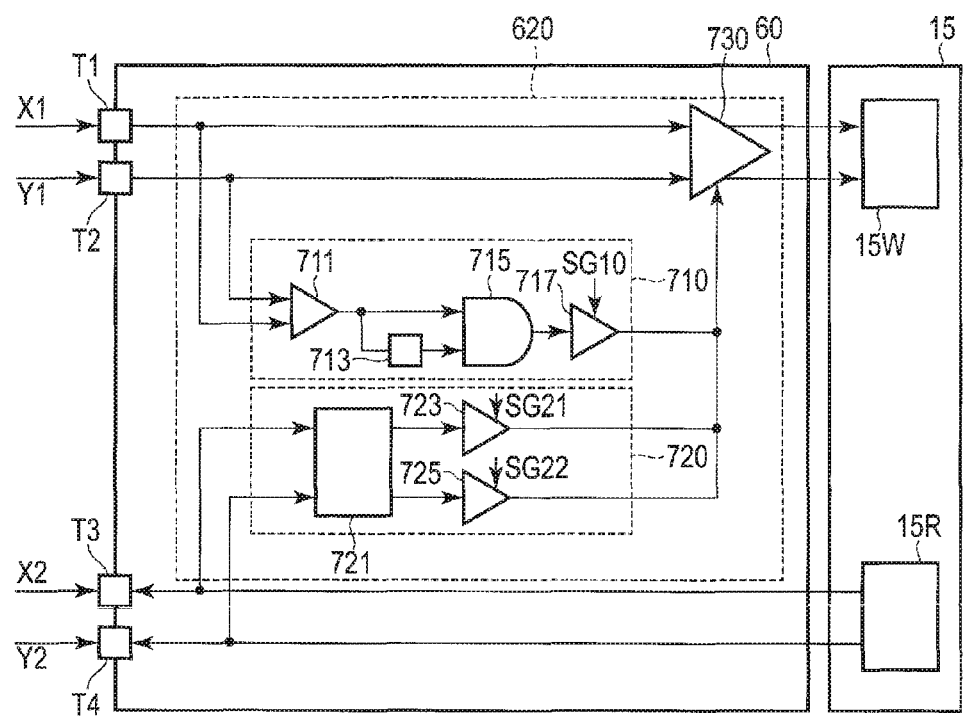
F I G. 3

TB51

| X2 | Y2 | Processing of low frequency pattern |
|---|---|---|
| L | L | OFF |
| L | H | Boost (Bst2) |
| H | L | Boost (Bst1) |
| H | H | Boost (Bst1+Bst2) |

| X2 | Y2 | Processing of low frequency pattern |
|---|---|---|
| L | L | Boost (Bst3) : Initial value |
| L | H | Boost (Bst4) |
| H | L | Increase |
| H | H | Boost (Bst4)+Increase |

| X2 | Y2 | Processing of low frequency pattern |
|---|---|---|
| L | L | Boost (Bst5) : Initial value |
| L | H | Boost (Bst6) |
| H | L | Suppression |
| H | H | Boost (Bst6)+Suppression |

FIG. 11

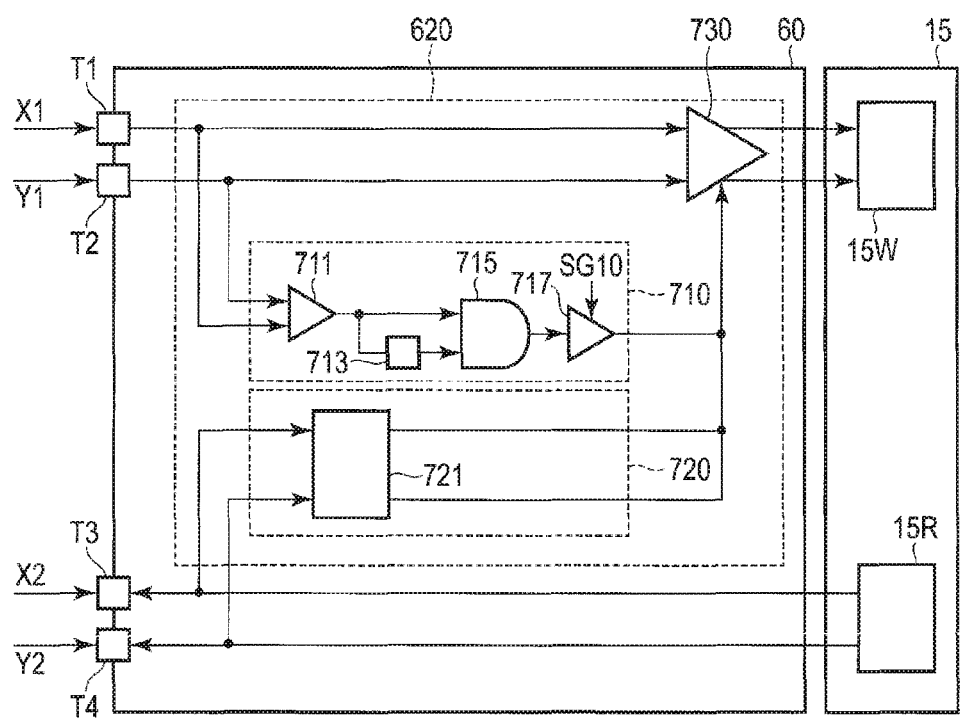
F I G. 10

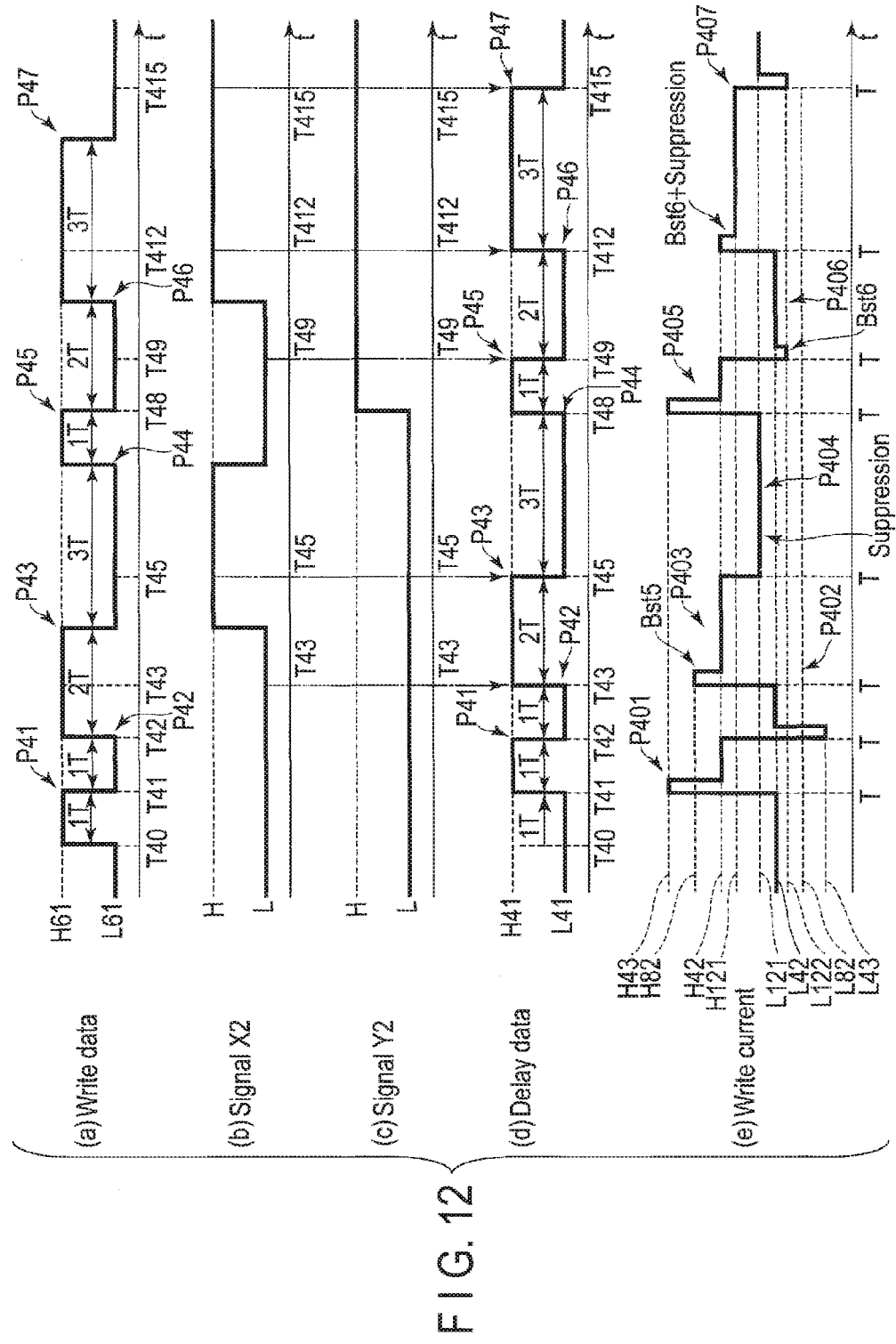
F I G. 12

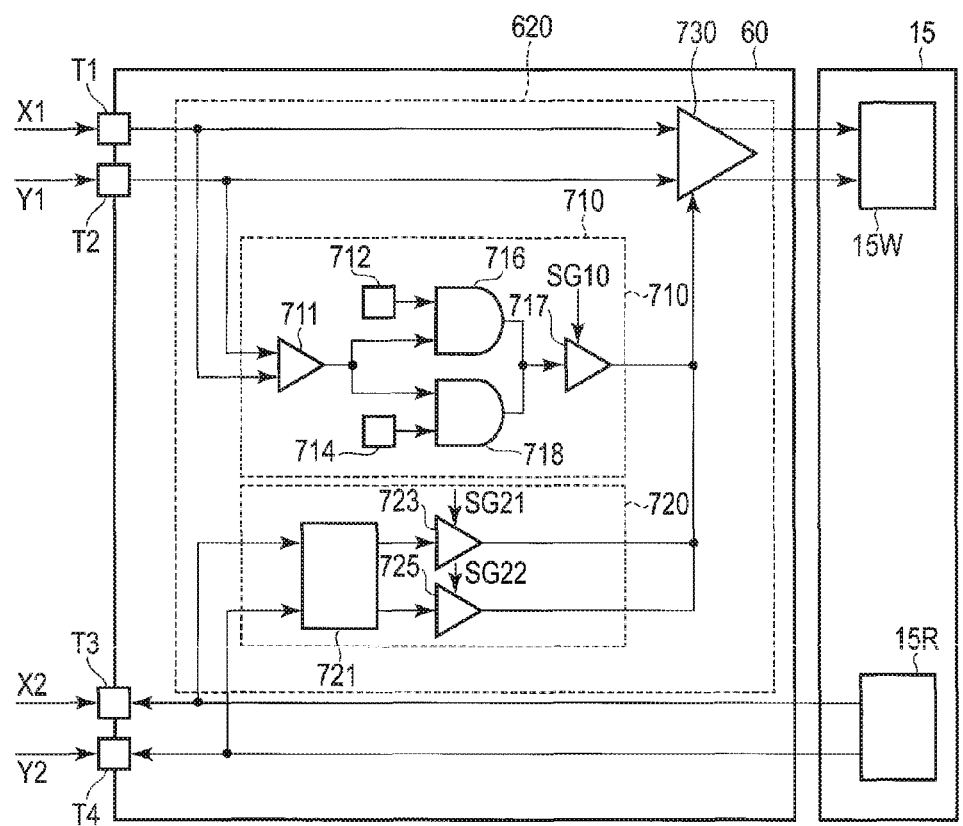
F I G. 13

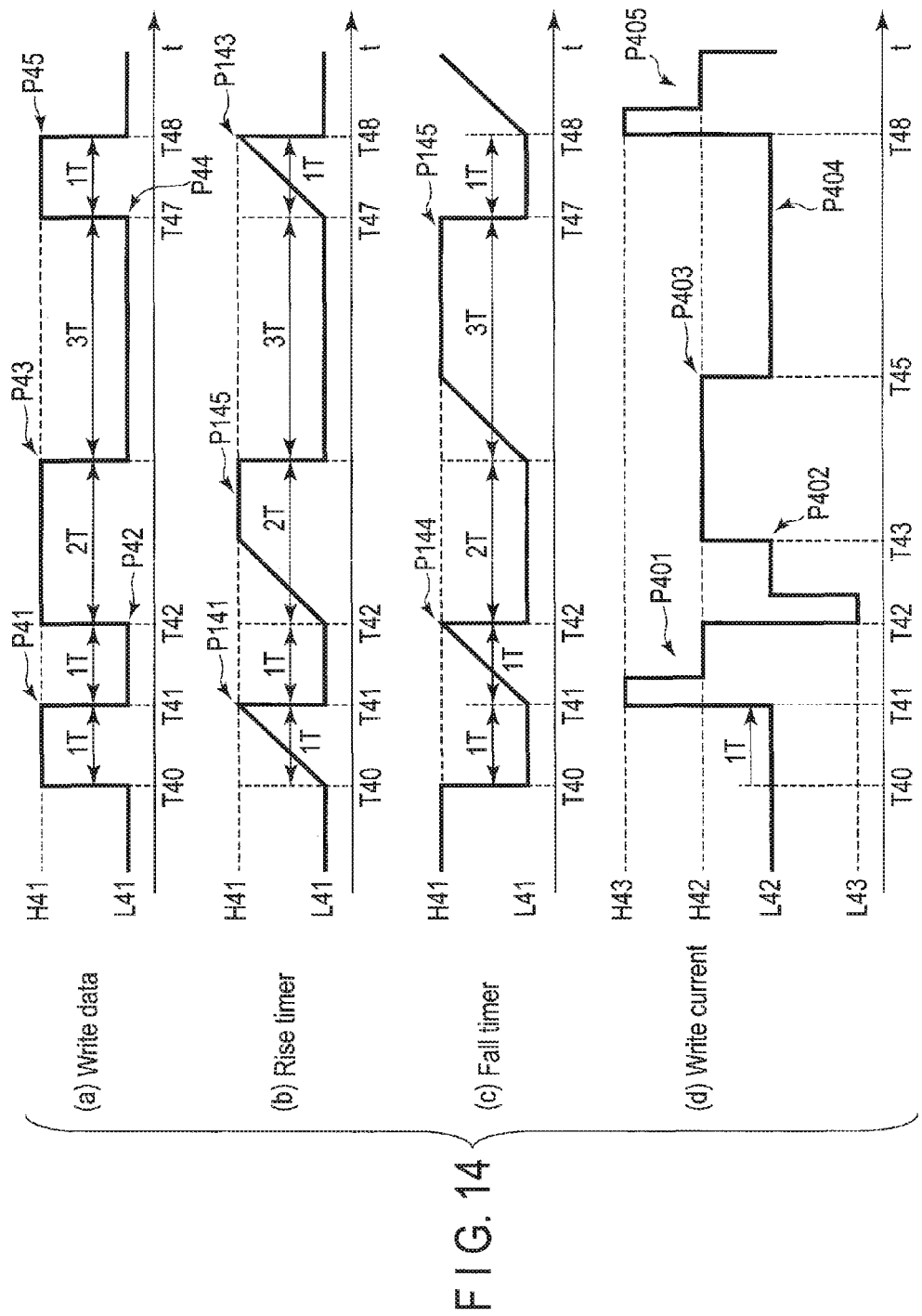
F I G. 14

MAGNETIC DISK DEVICE USING HEAD AMPLIFIER CIRCUIT FOR PATTERN DEPENDENT WRITE

CROSS-REFERENCE TO RELATED APPLICATIONS

This application is based upon and claims the benefit of priority from Japanese Patent Application No. 2017-038346, filed Mar. 1, 2017, the entire contents of which are incorporated herein by reference.

FIELD

Embodiments described herein relate generally to a magnetic disk device and a write processing method.

BACKGROUND

Magnetic disk devices include a read/write channel, head amplifier IC, and the like. In recent years, magnetic disk devices have a function to change a current value of a data pattern of a write current corresponding to a data pattern of write data. This function is referred to, for example, data dependent write (DDW), or pattern dependent write (PDW), or the like. The magnetic disk device inputs a control signal from the read/write channel to the head amplifier IC to change a current value of the data pattern of the write current, and on the basis of the control signal, changes the current value of the data pattern in the head amplifier IC to input the write current with the changed current value to a head. The magnetic disk device changes a current value of a data pattern of a high frequency write current and a current value of a data pattern of a low frequency write current, respectively, for outputting a suitable write current to the head. In that case, the magnetic disk device needs to input a control signal used for changing the current value of high frequency data pattern and the current value of low frequency data pattern from the read/write channel to the head amplifier IC. Since the magnetic disk device recognizes the high frequency data pattern or the low frequency data pattern in the read/write channel, require terminals, lines, and the like to transmit/receive the control signal between the read/write channel and the head amplifier IC.

BRIEF DESCRIPTION OF THE DRAWINGS

FIG. 1 is a block diagram showing the structure of a magnetic disk device of a first embodiment.

FIG. 3 is a schematic view of an example of a circuit of a head amplifier IC of the first embodiment.

FIG. 5 is a table showing an example of a relationship between a low frequency determination signal and processing of a low frequency pattern.

FIG. 7 is a table showing an example of a relationship between a low frequency determination signal and processing of a low frequency pattern.

FIG. 10 is a schematic view showing an example of a circuit of the head amplifier IC of the first embodiment.

FIG. 11 is a table showing an example of a relationship between a low frequency determination signal and processing of a low frequency pattern.

FIG. 12 shows an example of processing of a low frequency pattern of a write current on the basis of the table of FIG. 11.

FIG. 13 is a schematic view of an example of a circuit of a head amplifier IC of a second embodiment.

FIG. 14 shows an example of processing of a high frequency pattern of a write current in the second embodiment.

DETAILED DESCRIPTION

Figure 2:
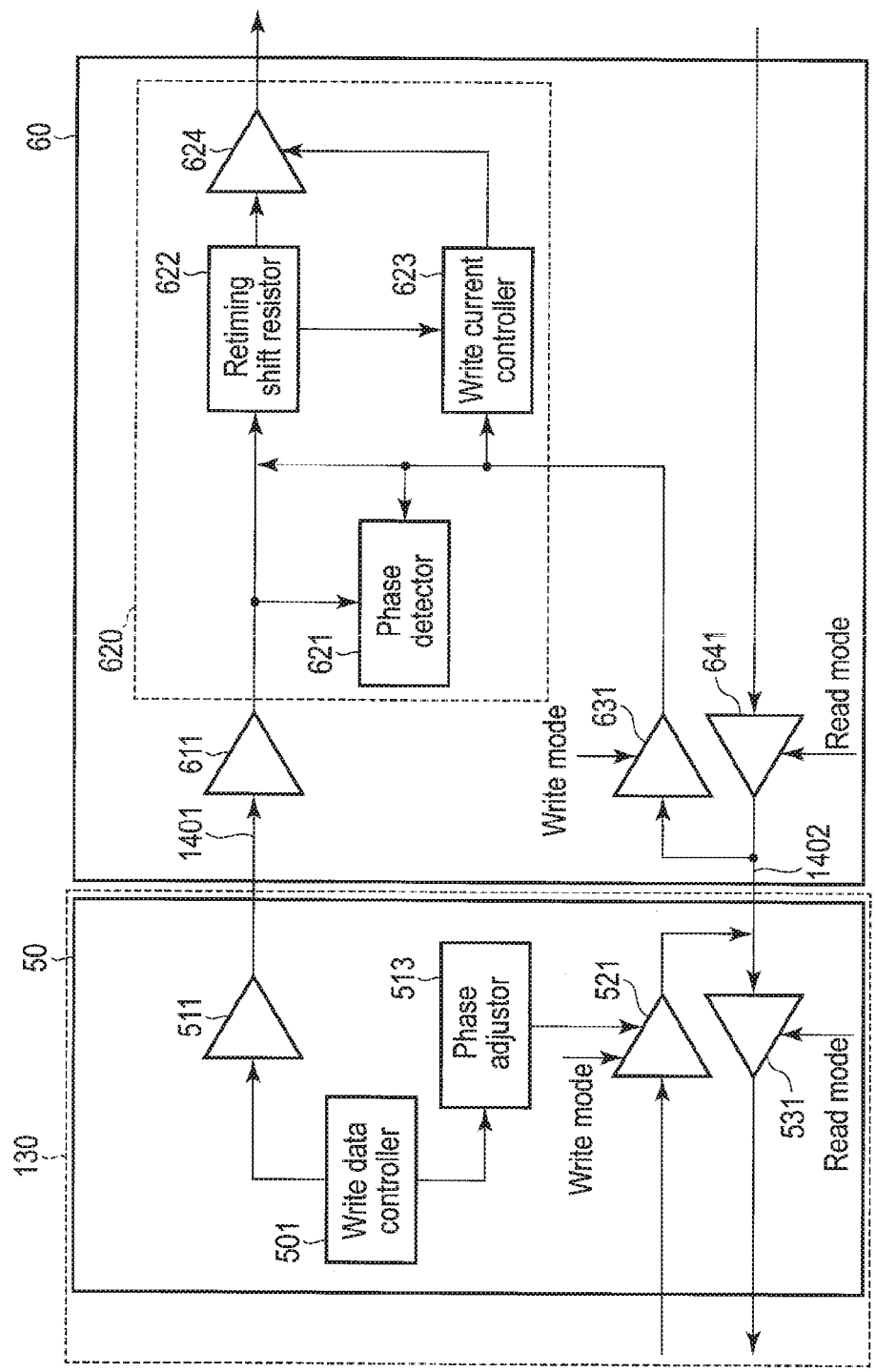
FIG. 2 is a schematic view of an example of the structure of a R/W channel of a write system.

In general, according to one embodiment, a magnetic disk device comprises a disk; a head configured to write data to the disk; and an integrated circuit configured to acquire a detection signal indicative of a first pattern of a first frequency of write data, change a first current of a second pattern of a write current corresponding to the first pattern on the basis of the detection signal, detect a third pattern of a second frequency which is greater than the first frequency from the write data, change a second current of a fourth pattern of the write current corresponding to the third pattern, and output the write current with the changed first current and the changed second current to the head.

Hereinafter, embodiments will be explained with reference to the accompanying drawings. Note that the drawings merely show examples and do not limit the scope of the invention.

First Embodiment

FIG. 1 is a block diagram showing the structure of a magnetic disk device 1 of a first embodiment. The magnetic disk device 1 of the present embodiment is, for example, a hard disk drive (HDD). The magnetic disk device 1 has a function to change a write current (current value) to be different from a write current in an ordinary write operation at a certain time. This function is, for example, referred to as data dependent write (DDW), or pattern dependent write (PDW), or the like. In the following description, the function will be referred to as PDW for the sake of simpler explanation.

The magnetic disk device 1 includes a head disk assembly (HDA), driver IC 20, head amplifier integrated circuit (head amplifier IC or preamplifier) 60, volatile memory 70, buffer memory (buffer) 80, nonvolatile memory 90, and system controller 130 which is a one chip integrated circuit, which will be described below. Furthermore, the magnetic disk device 1 is connected to a host system (host) 100.

The HAD includes a magnetic disk (disk) 10, spindle motor (SPM) 12, arm 13 including a head 15, and voice coil motor (VCM) 14. The disk 10 is rotated by the spindle motor 12. The arm 13 and the VCM 14 form an actuator. The actuator controls the movement of the head 15 mounted on the arm 13 to a target position on the disk 10 by driving the VCM 14. The number of the disk 10 and the head 15 may be two or more.

The disk 10 includes a memory area to which a recording area 10a used by a user and a system area 10b with data necessary for system management written therein are allocated.

The head 15 includes a slider as its main body, and a write head 15W and a read head 15R mounted on the slider. The write head 15W writes data on the disk 10. The read head 15R reads data recorded in the data track on the disk 10.

The driver IC 20 controls the drive of SPM 12 and VCM 14 on the basis of the control of the system controller 130 (specifically, MPU 30 which will be described later).

The volatile memory 70 is a semiconductor memory which loses data stored therein when a power supply is shut. The volatile memory 70 stores, for example, data necessary for processing in each part of the magnetic device 1. The volatile memory 70 is, for example, a dynamic random access memory (DRAM) or a synchronous dynamic random access memory (SDRAM).

The buffer memory 80 is a semiconductor memory which temporarily stores data transmitted/received between the magnetic disk device 1 and the host 100. Note that the buffer memory 80 may be structured integrally with the volatile memory 70. The buffer memory 80 is, for example, a DRAM, static random access memory (SRAM), SDRAM, ferroelectric random access memory (FeRAM), or magnetoresistive random access memory (MRAM).

The volatile memory 90 is a semiconductor memory which keeps data stored therein even when a power supply is shut. The nonvolatile memory 90 is, for example, a flash read only memory (FROM) of NOR type or NAND type.

The system controller (controller) 130 is realized using, for example, a large scale integrated circuit (LSI) in which a plurality of elements are integrated on a single chip, which is referred to as a system-on-a-chip (SoC). The system controller 130 includes a microprocessor (MPU) 30, hard disk controller (HDC) 40, and read/write (R/W) channel 50. The MPU 30, HDC 40, and R/W channel 50 each include a resistor (which is not shown).

The MPU 30 is a main controller which controls each part of the magnetic disk device 1. The MPU 30 controls the VCM 14 through the drive IC 20, and performs servo control to position the head 15. Furthermore, the MPU 30 controls a write operation of data to the disk 10 and selects a storage position of write data transmitted from the host 100. The MPU 30 performs processing on the basis of a firmware.

The HDC 40 controls the data transfer between the host 100 and the R/W channel 50 in response to an instruction from the MPU 30.

The R/W channel 50 performs signal processing of read data and write data. The R/W channel 50 includes a circuit or a function to measure signal quality of read data.

The head amplifier IC (preamplifier) 60 outputs a write current corresponding to write data output from the R/W channel 50 to the write head 15W in write processing. Furthermore, the head amplifier IC 60 amplifies a read signal from the read head 15R and outputs the amplified read signal to the read/write (R/W) channel 50 in read processing. The head amplifier IC 60 includes a resistor which is not shown and a resistor I/F (which is not shown) used for accessing the resistor from the outside.

In the following description, a system to write data from the host 100 to the disk 10 in the head 15, head amplifier IC 60, and controller 130 may be referred to as a write system.

FIG. 2 is a schematic view showing an example of the structure of the R/W channel 50 of the write system.

The R/W channel 50 includes, as the write system, a write data controller 501, buffers 511, 521, and 531, and phase adjustor 513. The write data controller 501, buffers 511, 521, and 531, and phase adjustor 513 are, for example, formed of circuits and controlled by MPU 30 or HDC 40. Note that, in the system controller 130, the write data controller 501, buffers 511, 521, and 531, and phase adjustor 513 may be included in either HDC 40 or R/W channel 50.

The R/W channel 50 is connected to the head amplifier IC 60 through a write data interface (I/F) (first circuit) 1401 and a read data I/F (second circuit) 1402. The R/W channel 50 transmits a signal related to write processing to the head amplifier IC 60 through the read data I/F 1402 in write processing. Note that the interfaces may each include a customized signal line or may share a signal line with the other interface.

The write data controller 501 is electrically connected to the buffer 511 and the phase adjustor 513. The write data controller 501 performs write compensation (record compensation) processing to write data from the host 100 and outputs the processed write data to the buffer 511. The write compensation (record compensation) is a process to preliminarily shift a time of polarization reverse (signal rise or signal fall) of the data pattern of write data by a time of a non-linear transition shift (NLTS).

Furthermore, the write data controller 501 generates a pattern dependent write (PDW) control signal used for instructing a phase (time) to change a current value of the data pattern of the write current corresponding to the data pattern of write data, and outputs the generated PDW control signal to the phase adjustor 513. For example, the write data controller 501 generates a PDW control signal (hereinafter, a low frequency determination signal or a detection signal) indicative of a time to change a current value (first current) of a low frequency pattern (second pattern) of a write current corresponding to a low frequency data pattern (hereinafter, a low frequency pattern (first pattern)) of write data. For example, the low frequency pattern is a data pattern data bit interval of which is greater than 1T.

The buffer 511 outputs the write data input from the write data controller 501 to the head amplifier IC 60 through the write data I/F 1401.

The phase adjustor 513 adjusts a time of PDW control signal input by the write data controller 501 to be synchronized with the write data output to the head amplifier IC 60 through the buffer 511. The phase adjustor 513 outputs The PDW control signal with the adjusted time to the buffer 521.

When receiving a write mode control signal from MPU 30, for example, the buffer 521 outputs a PDW control signal input from the phase adjustor 513, for example, a low frequency determination signal to the head amplifier IC 60 through the read data I/F 1402.

The head amplifier IC 60 includes, as the write system, buffers 611, 631, and 641 and write current generator 620, which are, for example, formed of circuits and controlled by MPU 30 or HDC 40.

The buffer 611 is electrically connected to the write current generator 620. The buffer 611 outputs write data input from the buffer 511 of the R/W channel 50 through the write data I/F 1401 to the write current generator 620.

The buffer 631 is electrically connected to the write current generator 620. When receiving a write mode signal from MPU 30, for example, the buffer 631 outputs write data input from the buffer 521 of the R/W channel 50 through the read data I/F 1402 to the write current generator 620.

When receiving a read mode signal from MPU 30, for example, the buffer 641 outputs read data input from the head 15 to the R/W channel 50 through the read data I/F 1402.

The write current generator 620 includes a phase detector 621, retiming shift resistor 622, write current controller 623, and buffer 624. Note that the write current generator 620 may include buffers 611, 631, and 641.

The phase detector 621 is connected to, for example, the buffer 611, buffer 631, retiming shift resistor 622, and write current controller 623. The phase detector 621 detects a time of data pattern of an input signal and outputs a control signal on the basis of a result of detection to the retiming shift resistor 622 and the write current controller 623. For example, the phase detector 621 detects a time of data pattern of write data input from the buffer 611 and a time of data pattern of low frequency determination signal input from the buffer 631.

The retiming shift resistor 622 is connected to, for example, the buffer 611, buffer 624, and write current controller 623. The retiming shift resistor 622 performs retiming of data pattern of write data input from the buffer 611 and outputs the retimed data pattern to the buffer 624 and the write current controller 623.

The write current controller 623 is electrically connected to, for example, the buffer 611, phase detector 621, retiming shift resistor 622, and buffer 624. The write current controller 623 generates a PDW control signal (hereinafter, high frequency determination signal) indicative of a time to change a current value (second current) of a high frequency pattern (fourth pattern) of a write current corresponding to a high frequency data pattern (hereinafter, a high frequency pattern (third pattern)) of write data. For example, the high frequency pattern is a data pattern data bit interval of which is 1T or less. That is, the frequency of the high frequency pattern is greater than the frequency of the low frequency pattern. For example, the write current controller 623 compares the data pattern of write data input from the buffer 611 to the data pattern of write data input from the retiming shift resistor 622, and generates a high frequency determination signal on the basis of a result of the comparison.

The write current controller 623 generates, on the basis of the low frequency determination signal input from the buffer 631, a low frequency control signal which controls the strength of a current value of the low frequency pattern of the write current and outputs the low frequency control signal to the buffer 624. The write current controller 623 generates, on the basis of the generated high frequency determination signal, a high frequency control signal which controls the strength of a current value of the high frequency pattern of the write current and outputs the high frequency control signal to the buffer 624. When a low frequency control signal is input during the generation of the high frequency determination signal, the write current controller 623 generates the high frequency determination signal in advance of the low frequency control signal.

The buffer 624 supplies a current on the basis of the high frequency control signal and the low frequency control signal input from the write current controller 623 to overlap with the write data input from the retiming shift resistor 622 and outputs the write data to the outside of the head amplifier IC 60, for example, the head 15.

FIG. 3 schematically shows an example of a circuit of the head amplifier IC 60 of the first embodiment. In FIG. 3, for the sake of simpler explanation, the structure of FIG. 2 is only partly shown. Furthermore, in the example of FIG. 3, the head amplifier IC 60 transmits a signal in a differential method. Note that the head amplifier IC 60 may transmit a signal through a method other than the differential method.

In FIG. 3, the head amplifier IC 60 includes a pair of terminals T1 and T2 which transmit a differential signal, a pair of terminals T3 and T4 which transmit a differential signal, and write current generator 620.

The terminals T1 and T2 are electrically connected to the R/W channel 50 and the write current generator 620. To the terminals T1 and T2, two signals branched from a single signal are input, respectively. For example, reverse phase signals are input to the terminals T1 and T2. For example, separated write data X1 and Y1 input from the outside, for example, the R/W channel 50 are input to the terminals T1 and T2, respectively.

Terminals T3 and T4 are electrically connected to the R/W channel 50, write current generator 620, and read head 15R. For example, in write processing, two PDW control signals input from the outside, for example, the R/W channel 50; that is, low frequency determination signals X2 and Y2 are input to the terminals T3 and T4, respectively. Furthermore, for example, in read processing, read data from the outside, for example, the read head 15R and separated into two are input to the terminals T3 and T4, respectively.

The write current generator 620 includes a high frequency signal circuit 710, low frequency signal circuit 720, and write driver 730.

The high frequency signal circuit 710 compares the data pattern of write data input through the terminals T1 and T2 to the write data with a data pattern delayed by a certain period of time, for example, by an interval of the high frequency pattern to be detected (hereinafter, a determination time), and detects the high frequency pattern of write data. In the following description, the write data delayed by a certain period of time will be referred to as delay data. The high frequency signal circuit 710 generates a high frequency determination signal from a result of the detection. The high frequency signal circuit 710 generates a high frequency control signal which controls a current value of the high frequency pattern of the write current to a certain strength on the basis of the high frequency determination signal and outputs the high frequency control signal to the write driver 730.

The high frequency signal circuit 710 includes, for example, a buffer 711, delay circuit 713, AND circuit 715, and buffer 717. The high frequency signal circuit 710 is an example and may have a different circuit structure.

The buffer 711 is electrically connected to the delay circuit 713 and the AND circuit 715. The buffer 711 outputs two write data transmitted through the differential method input through the terminals T1 and T2 as one write data to the delay circuit 713 and the AND circuit 715.

The delay circuit 713 is electrically connected to the AND circuit 715. The delay circuit 713 outputs delay data which is a data pattern of write data input from the buffer 711 delayed by a determination time to the AND circuit 715. The delay circuit 713 acquires a set determination time from a resistor (which is not shown). The determination time is, for example, 1T. Note that the determination time can be set arbitrarily.

The AND circuit 715 is electrically connected to the buffer 717. The AND circuit 715 compares the data pattern of write data input from the buffer 711 to the data pattern of delay data, detects a high frequency pattern of write data, and outputs a high frequency determination signal generated from a result of detection to the buffer 717.

The buffer 717 is, for example, electrically connected to the write driver 730. The buffer 717 generates a high frequency control signal on the basis of the high frequency determination signal input from the AND circuit 715 and outputs the generated high frequency control signal to the write driver 730. In the buffer 717, a control signal SG10 which instructs the strength of a current value of the high frequency pattern of the write current is input. Note that the buffer 717 may acquire the control signal SG10 from a resist in the head amplifier IC 60 (which is not shown) or from MPU 30.

The low frequency signal circuit 720 generates a low frequency control signal on the basis of the low frequency determination signal input through the terminals T3 and T4 and outputs the generated low frequency control signal to the write driver 730.

The low frequency signal circuit 720 includes, for example, a combination circuit 721, buffer 723, and buffer 725. The low frequency signal circuit 720 is an example and may have a different circuit structure.

The combination circuit 721 is electrically connected to the buffers 723 and 725. The combination circuit 721 outputs the low frequency determination signal to at least one of the buffers 723 and 725 on the basis of the low frequency determination signals X2 and Y2 input through the terminals T3 and T4.

The buffer 723 is, for example, electrically connected to the write driver 730. The buffer 723 generates a low frequency control signal (hereinafter, a first low frequency control signal) on the basis of the low frequency determination signal input from the combination circuit 721, and outputs the generated signal to the write driver 730. A control signal SG21 which instructs the strength of the current value of the low frequency pattern of the write current is input in the buffer 723. Note that the buffer 723 may acquire the control signal SG21 from a resist in the head amplifier IC 60 (which is not shown) or from MPU 30.

The buffer 725 is, for example, electrically connected to the write driver 730. The buffer 725 generates a low frequency control signal which is different from the first low frequency control signal (hereinafter, a second low frequency control signal) on the basis of the low frequency determination signal input from the combination circuit 721, and outputs the generated signal to the write driver 730. A control signal SG22 which instructs the strength of the current value of the low frequency pattern of the write current is input in the buffer 725. Note that the buffer 725 may acquire the control signal SG22 from a resist in the head amplifier IC 60 (which is not shown) or from MPU 30. Furthermore, the strength of the current value of the low frequency pattern instructed by the second low frequency control signal may be equal to the strength of the current value of the low frequency pattern instructed by the first low frequency control signal.

The write driver 730 is electrically connected to the write head 15W. The write driver 730 generates a write current on the basis of write data input through the terminals T1 and T2, high frequency control signal input from the high frequency signal circuit 710, and low frequency control signal input from the low frequency signal circuit 720, and outputs the generated write current to the write head 15W. For example, the write driver 730 generates a data pattern of the write current corresponding to the data pattern of write data input through the terminals T1 and T2. The write drive 730 changes, on the basis of the high frequency control signal input from the high frequency signal circuit 710, the strength of a current value of the high frequency pattern (fourth pattern) of the write current corresponding to the high frequency pattern (third pattern) of write data. The write driver 730 changes, on the basis of the first low frequency signal and the second low frequency signal input from the low frequency signal circuit 720, the strength of the low frequency pattern (second pattern) of the write current corresponding to the low frequency pattern (first pattern) of write data. The write driver 730 outputs the write current with the changed high frequency signal and the changed low frequency signal to the write head 15W. Note that, when a low frequency control signal is input during the generation of the high frequency determination signal in the high frequency signal circuit 710, the write driver 730 performs processing of the high frequency signal circuit 710 in advance thereof. Furthermore, the write driver 730 may count each of the high frequency pattern of write data and the low frequency pattern of write data, and select each of the high frequency pattern of the write current corresponding to the high frequency pattern of write data to be changed and the low frequency pattern of the write current corresponding to the low frequency pattern of write data to be changed.

Figure 4:
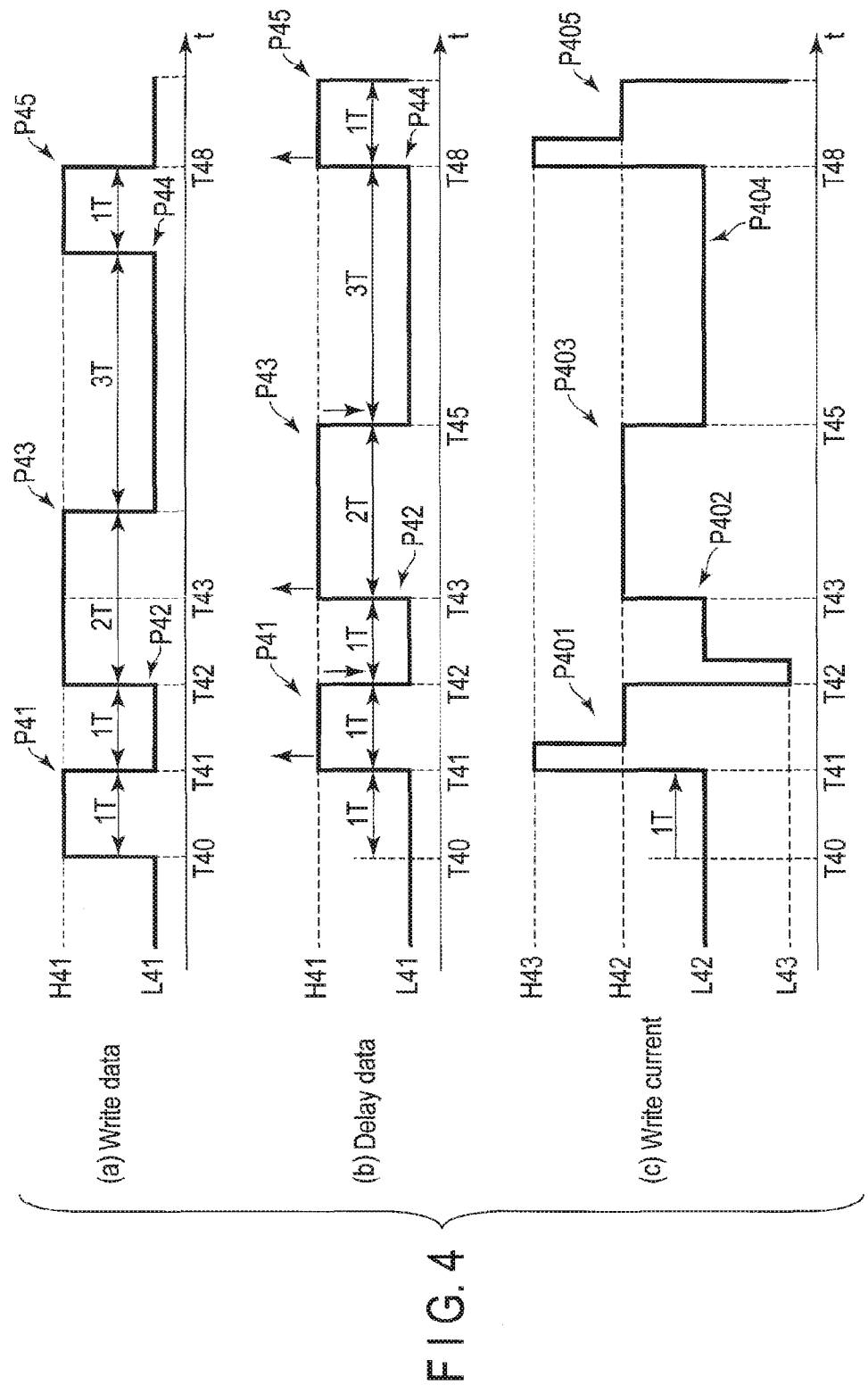
FIG. 4 shows an example of processing a high frequency pattern of a write current of the first embodiment.

FIG. 4 shows an example of processing of a high frequency pattern of the write current of the first embodiment. In the following description, a high level voltage or current is Low (hereinafter, L) and a low level voltage or current is High (hereinafter, H). That is, H is greater than L in a voltage or current wise.

FIG. 4(a) shows an example of a data pattern of write data input in the head amplifier IC 60, FIG. 4(b) shows an example of a data pattern of delay data delayed in the head amplifier IC 60, and FIG. 4(c) shows an example of a data pattern of write current changed on the basis of a high frequency control signal. In FIGS. 4(a) to 4(c), the high frequency patterns of write data and the write current have a data bit interval of 1T. In the write data and the delay data of FIGS. 4(a) and 4(b), a voltage H41 has a voltage level higher than that of a voltage L41. Furthermore, in the write current of FIG. 4(c), a current H42 is greater than a current L42. In the write current of FIG. 4(c), a current H43 is greater than a current H42 and a current L43 is less than a current L42.

The head amplifier IC 60 generates a data pattern of delay data of FIG. 4(b) which is a data pattern of write data of FIG. 4(a) input from the R/W channel 50 delayed by a determination time, for example, by 1T. The head amplifier IC 60 compares the data pattern of write data of FIG. 4(a) and the data pattern of delay data of FIG. 4(b) at a time when the data pattern rises and falls. When the data pattern of write data of FIG. 4(a) and the data pattern of delay data of FIG. 4(b) have reverse polarities from a result of the comparison, the head amplifier IC 60 determines that the pattern is the high frequency pattern of write data, that is, 1T data pattern. At a time when the data pattern rises or falls, the head amplifier IC 60 supplies an overshoot (overshoot current) or an undershoot (undershoot current) to overlap with the current value of the high frequency pattern of the write current corresponding to the high frequency pattern of delay data of FIG. 4(b). In the following description, supplying an overshoot (overshoot current) or an undershoot (undershoot current) to overlap with a current value of a data pattern may be referred to as boosting a data pattern. The head amplifier IC 60 outputs the write current of the boosted data pattern of FIG. 4(c) to the write head 15W. Note that the head amplifier IC 60 may acquire data related to the high frequency pattern of write data detected by the R/W channel 50 from a resist (which is not shown). Furthermore, the head amplifier IC 60 may count the high frequency pattern of write data and boost the high frequency pattern of the write current corresponding to the high frequency pattern of the selected write data.

In the example depicted, the head amplifier IC 60 compares the polarity of the data pattern of write data and the polarity of the data pattern of delay data at times T41, T43, T45, and T48 when the data pattern of delay data rises and at times T42, T45, and T49 when the data pattern of delay data falls.

The head amplifier IC 60 determines that, since the data pattern of write data rises and the data pattern of delay data falls at time T41, a data pattern P41 is a high frequency pattern of write data. The head amplifier IC 60 supplies a boost current to overlap with a current value of a data pattern P401 of the write current at time T41 when the data pattern P401 of the write current corresponding to the data pattern P41 of delay data rises (overshoot).

The head amplifier IC 60 determines that, since the data pattern of write data rises and the data pattern of delay data falls at time T42, a data pattern P42 is a high frequency pattern of write data. The head amplifier IC 60 supplies a boost current to overlap with a current value of a data pattern P402 of the write current at time T42 when the data pattern P402 of the write current corresponding to the data pattern P42 of delay data falls (undershoot).

The head amplifier IC 60 determines that, since the data pattern of write data rises and the data pattern of delay data rises at time T43, a data pattern P43 is not a high frequency pattern of write data. The head amplifier IC 60 generates a data pattern P403 of the write current corresponding to the data pattern P43 of delay data.

As to the head amplifier IC 60 determines that, since the data pattern of write data falls and the data pattern of delay data falls at time T45, a data pattern P44 is not a high frequency pattern of write data. The head amplifier IC 60 generates a data pattern P404 of the write current corresponding to the data pattern P44 of delay data.

The head amplifier IC 60 determines that, since the data pattern of write data rises and the data pattern of delay data rises at time T48, a data pattern P45 is a high frequency pattern of write data. The head amplifier IC 60 supplies a boost current to overlap a current value of a data pattern P405 of the write current at time T48 when the data pattern P405 corresponding to the data pattern P45 of delay data rises (overshoot).

Some examples of processing of a low frequency pattern of a write current of the present embodiment will be explained with reference to FIGS. 5, 6, 7, and 8.

FIG. 5 is a table showing an example of a relationship between low frequency determination signals X2 and Y2 and processing of a low frequency pattern.

The head amplifier IC 60 controls a low frequency pattern of a write current on the basis of, for example, low frequency determination signals X2 and Y2 input from the R/W channel 50 as shown in table TB51. In the figure depicted, the head amplifier IC 60 does not change an ordinarily set low frequency pattern of the write current if a data pattern of the low frequency determination signal X2 is L and a data pattern of the low frequency determination signal Y2 is L. The head amplifier IC 60 boosts the low frequency pattern of the write current with a boost current Bst2 if the data pattern of the low frequency determination signal X2 is L and the data pattern of the low frequency determination signal Y2 is H. The head amplifier IC 60 boosts the low frequency pattern of the write current with a boost current Bst1 if the low frequency determination signal X2 is H and the low frequency determination signal Y2 is L. The head amplifier IC 60 boosts the low frequency pattern of the write current with the boost currents Bst1 and Bst2 if the data pattern of the low frequency determination signal X2 is H and the data pattern of the low frequency determination signal Y2 is H. Note that the head amplifier IC 60 may hold the setting shown in table TB51 in a resist which is not shown. The head amplifier IC 60 may refer to table TB51 to control the low frequency pattern of the write current if the low frequency determination signals X2 and Y2 are input.

Figure 6:
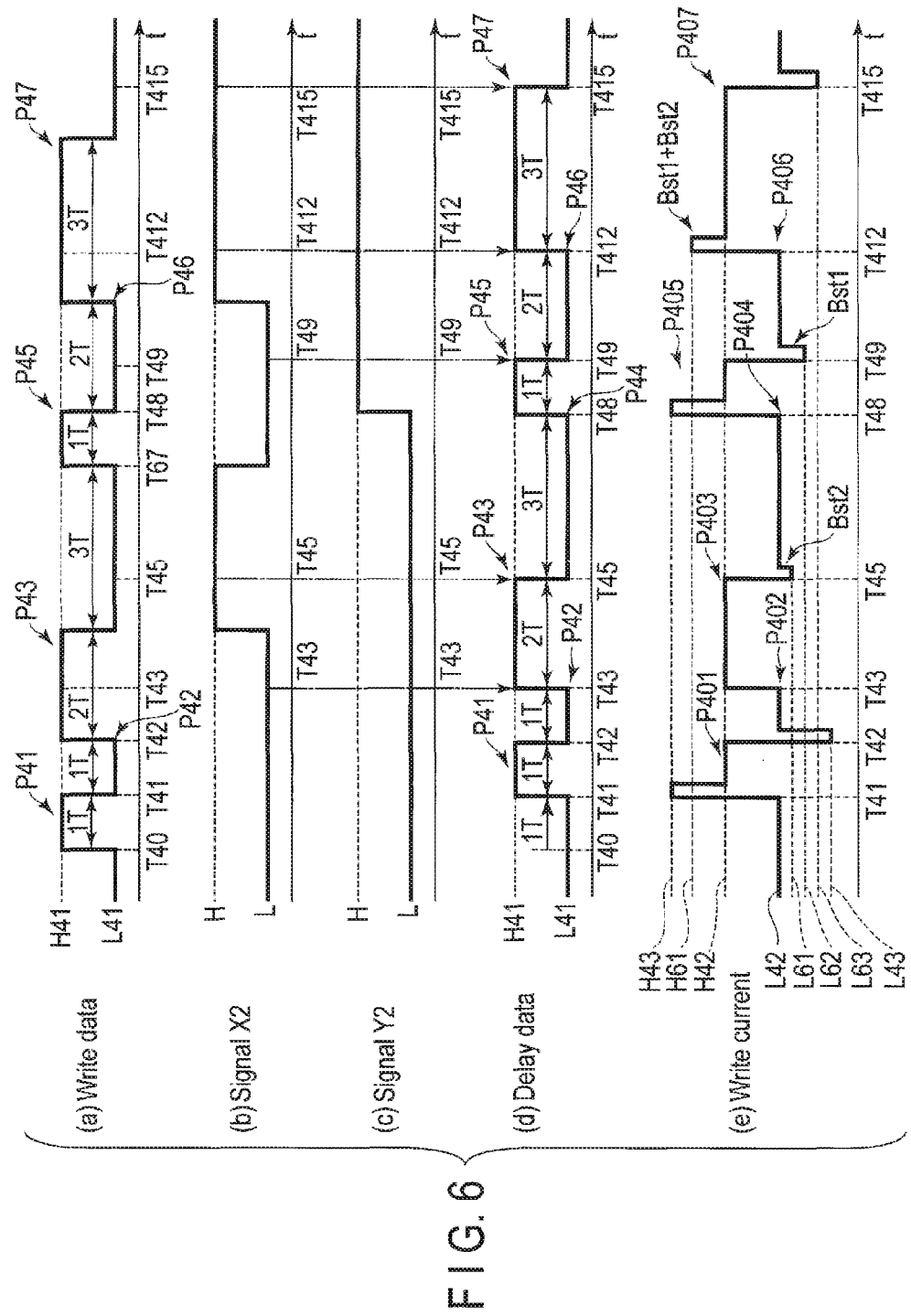
FIG. 6 shows an example of processing of a low frequency pattern of a write current on the basis of the table of FIG. 5.

FIG. 6 shows an example of processing of a low frequency pattern of a write current on the basis of the table of FIG. 5. Note that high frequency patterns of write data, delay data, and write current of FIG. 4 are shown in FIG. 6; however, detailed description thereof will be omitted.

FIG. 6(a) shows an example of a data pattern of write data input in the head amplifier IC 60, FIG. 6(b) shows an example of a data pattern of a low frequency determination signal X2 input from the R/W channel 50 to the head amplifier IC 60, and FIG. 6(c) shows an example of a data pattern of a low frequency determination signal Y2 input from the R/W channel 50 to the head amplifier IC 60, and FIG. 6(d) shows an example of a data pattern of delay data delayed in the head amplifier IC 60, and FIG. 6(e) shows an example of a data pattern of a write current changed on the basis of a low frequency control signal. In the write current of FIG. 6(e), a current H61 is greater than a current H42 and is less than a current H43. Furthermore, in FIG. 6(e), a current L61 is less than a current L42 and a current L62 is less than a current L61. A current L63 is less than a current L62 and is greater than a current L43.

The head amplifier IC 60 generates a data pattern of delay data as shown in FIG. 6(d) by delaying the data pattern of write data of FIG. 6(a) input from the R/W channel 50 by a determination time, for example, by 1T. The head amplifier IC 60 checks the data pattern of the low frequency determination signal X2 of FIG. 6(b) and the data pattern of the low frequency determination signal Y2 of FIG. 6(c) input from the R/W channel 50 when the low frequency pattern of delay data rises and falls. The head amplifier IC 60 boosts a data pattern of the write current corresponding to the data pattern of delay data of FIG. 6(d) when the low frequency pattern of write data rises or falls as shown in table TB51 of FIG. 5. The head amplifier IC 60 outputs a write current of FIG. 6(e) with boosted high frequency pattern and low frequency pattern of the write current to the write head 15W. Note that the head amplifier IC 60 may acquire data related to a low frequency pattern of write data detected in the R/W channel 50 from a resist (which is not shown). Furthermore, the head amplifier IC 60 may count the low frequency pattern of write data and boost the low frequency pattern of the write current corresponding to the selected low frequency pattern of write data.

In the example depicted, the head amplifier IC 60 checks the data pattern of the low frequency determination signals X2 and Y2 at time T43 when the data pattern P43 of delay data rises. Since the data pattern of the low frequency determination signal X2 is L and the data pattern of the low frequency determination signal Y2 is L, the head amplifier IC 60 outputs a current value of ordinary strength of the data pattern P403 of the write current corresponding to the data pattern P43 of delay data as shown in table TB51 of FIG. 5.

The head amplifier IC 60 checks the data pattern of the low frequency determination signals X2 and Y2 at time T45 when the data pattern P44 of delay data rises. Since the data pattern of the low frequency determination signal X2 is H and the data pattern of the low frequency determination signal Y2 is L, the head amplifier IC 60 supplies a boost current Bst2 of delay data to overlap the current value L42 of the data pattern P404 of the write current at time T45 when the data pattern P404 of the write current corresponding to the data pattern P44 of delay data falls (overshoot) as shown in table TB51 of FIG. 5.

The head amplifier IC 60 checks the data pattern of the low frequency determination signals X2 and Y2 at time T49 when the data pattern P46 of delay data falls. Since the data pattern of the low frequency determination signal X2 is L and the data pattern of the low frequency determination signal Y2 is H, the head amplifier IC 60 supplies a boost current Bst1 to overlap the current value L42 of the data pattern P406 of the write current at time T49 when the data pattern P406 of the write current corresponding to the data pattern P46 of delay data falls (overshoot) as shown in table TB51 of FIG. 5.

The head amplifier IC 60 checks the data pattern of the low frequency determination signals X2 and Y2 at time T412 when the data pattern P47 of delay data rises. Since the data pattern of the low frequency determination signal X2 is H and the data pattern of the low frequency determination signal Y2 is H, the head amplifier IC 60 supplies a boost current Bst1+Bst2 of delay data to overlap the current value H42 of the data pattern P407 of the write current at time T412 when the data pattern P407 of the write current corresponding to the data pattern P47 of delay data rises as shown in the table of FIG. 5.

FIG. 7 is a table showing an example of a relationship between low frequency determination signals X2 and Y2 and processing of a low frequency pattern.

The head amplifier IC 60 controls a low frequency pattern of a write current on the basis of, for example, low frequency determination signals X2 and Y2 input from the R/W channel 50 as shown in table TB52. In the figure depicted, the head amplifier IC 60 boosts the low frequency pattern of the write current with a boost current Bst3 if a data pattern of the low frequency determination signal X2 is L and a data pattern of the low frequency determination signal Y2 is L. The head amplifier IC 60 boosts the low frequency pattern of the write current with a boost current Bst4 if the data pattern of the low frequency determination signal X2 is L and the data pattern of the low frequency determination signal Y2 is H. The head amplifier IC 60 increases the low frequency pattern of the write current if the low frequency determination signal X2 is H and the low frequency determination signal Y2 is L. The head amplifier IC 60 increases a current value of the low frequency pattern of the write current and boosts the low frequency pattern with a boost current Bst4 if the data pattern of the low frequency determination signal X2 is H and the data pattern of the low frequency determination signal Y2 is H. Note that the head amplifier IC 60 may hold the setting shown in table TB52 in a resist which is not shown. The head amplifier IC 60 may refer to table TB52 to control the low frequency pattern of the write current if the low frequency determination signals X2 and Y2 are input.

Figure 8:
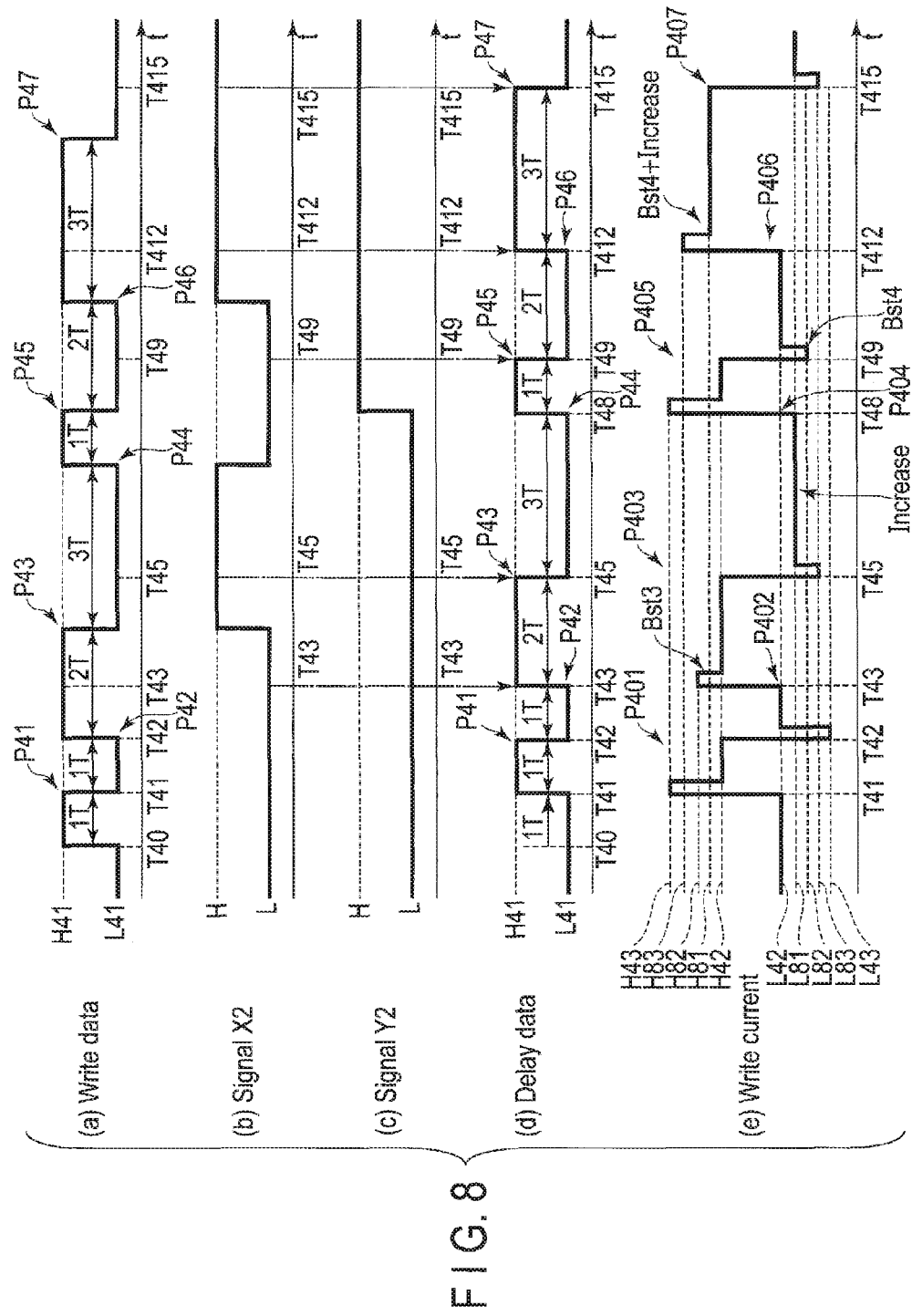
FIG. 8 shows an example of processing of a low frequency pattern of a write current on the basis of the table of FIG. 7.

FIG. 8 shows an example of processing of a low frequency pattern of a write current on the basis of the table of FIG. 7. Note that high frequency patterns of write data, delay data, and write current of FIG. 4 are shown in FIG. 6; however, detailed description thereof will be omitted.

FIG. 8(*a*) shows an example of a data pattern of write data input in the head amplifier IC 60, FIG. 8(*b*) shows an example of a data pattern of a low frequency determination signal X2 input from the R/W channel 50 to the head amplifier IC 60, and FIG. 8(*c*) shows an example of a data pattern of a low frequency determination signal Y2 input from the R/W channel 50 to the head amplifier IC 60, and FIG. 8(*d*) shows an example of a data pattern of delay data delayed in the head amplifier IC 60, and FIG. 8(*e*) shows an example of a data pattern of a write current changed on the basis of a low frequency control signal. In the write current of FIG. 8(*e*), a current H81 is greater than a current H42 and a current H82 is greater than the current H81. A current H83 is greater than the current H82 and is less than a current H43. Furthermore, in FIG. 8(*e*), a current L81 is less than a current L42 and a current L82 is less than a current L81. A current L83 is less than a current L82 and is greater than a current L43.

The head amplifier IC 60 generates a data pattern of delay data as shown in FIG. 8(*d*) by delaying the data pattern of write data of FIG. 8(*a*) input from the R/W channel 50 by a determination time, for example, by 1T. The head amplifier IC 60 checks the data pattern of the low frequency determination signal X2 of FIG. 8(*b*) and the data pattern of the low frequency determination signal Y2 of FIG. 8(*c*) input from the R/W channel 50 at a time when the low frequency pattern of delay data rises and falls. The head amplifier IC 60 changes a current value of a data pattern of the write current corresponding to the data pattern of delay data of FIG. 8(*d*) at a time when the low frequency pattern of write data rises or falls as shown in table TB52 of FIG. 7. The head amplifier IC 60 outputs a write current of FIG. 8(*e*) with changed current value of each of the high frequency pattern and low frequency pattern of the write current to the write head 15W. Note that the head amplifier IC 60 may acquire data related to a low frequency pattern of write data detected in the R/W channel 50 from a resist (which is not shown). Furthermore, the head amplifier IC 60 may count the low frequency pattern of write data and change a current value of the low frequency pattern of the write current corresponding to the selected low frequency pattern of write data.

In the example depicted, the head amplifier IC 60 checks the data pattern of the low frequency determination signals X2 and Y2 at time T43 when the data pattern P43 of delay data rises. Since the data pattern of the low frequency determination signal X2 is L and the data pattern of the low frequency determination signal Y2 is L, the head amplifier IC 60 supplies a boost current Bst3 to overlap with a current value H42 of a data pattern P403 of the write current at time T43 when the data pattern P403 of the write current corresponding to the data pattern P43 of delay data rises (overshoot) as shown in table TB52 of FIG. 7.

The head amplifier IC 60 checks the data pattern of the low frequency determination signals X2 and Y2 at time T45 when the data pattern P44 of delay data rises. Since the data pattern of the low frequency determination signal X2 is H and the data pattern of the low frequency determination signal Y2 is L, the head amplifier IC 60 increases a data pattern P404 of write current corresponding to the data pattern P44 of delay data as shown in table TB52 of FIG. 7.

The head amplifier IC 60 checks the data pattern of the low frequency determination signals X2 and Y2 at time T49 when the data pattern P46 of delay data rises. Since the data pattern of the low frequency determination signal X2 is L and the data pattern of the low frequency determination signal Y2 is H, the head amplifier IC 60 supplies a boost current Bst4 to overlap the current value L42 of the data pattern P406 of the write current at time T49 when the data pattern P406 of the write current corresponding to the data pattern P46 of delay data rises (undershoot) as shown in table TB52 of FIG. 7.

The head amplifier IC 60 checks the data pattern of the low frequency determination signals X2 and Y2 at time T412 when the data pattern P47 of delay data rises. Since the data pattern of the low frequency determination signal X2 is H and the data pattern of the low frequency determination signal Y2 is H, the head amplifier IC 60 increases a current value of a data pattern P407 of a write current and supplies a boost current Bst4 at time T412 when the data pattern P407 of the write current corresponding to the data pattern P47 of delay data rises as shown in the table of FIG. 7.

Note that processing of the low frequency pattern of write current shown in FIGS. 5 to 8 is an example, and the head amplifier IC 60 may perform different processing to the low frequency pattern of write current on the basis of the determination signals X2 and Y2.

Figure 9:
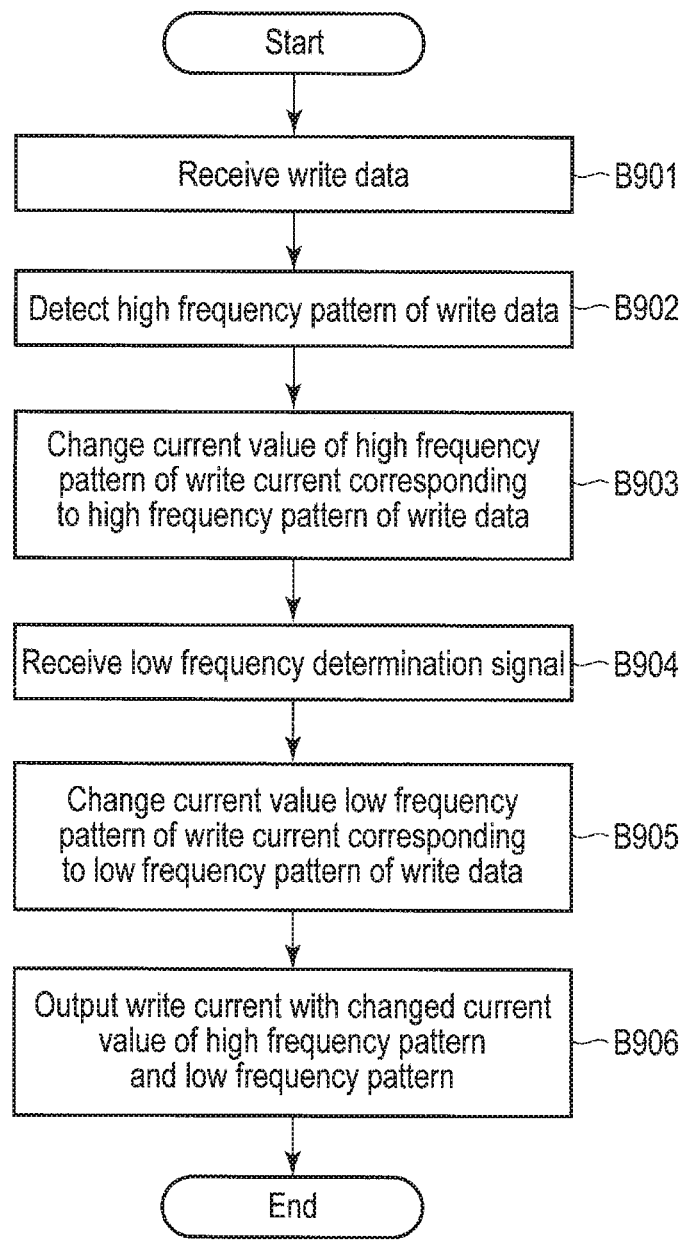
FIG. 9 is a flowchart showing a processing method of the head amplifier IC of the first embodiment.

FIG. 9 is a flowchart showing a processing method of the head amplifier IC 60 of the first embodiment.

The head amplifier IC 60 receives write data from the outside, for example, the R/W channel 50 through the write data I/F 1401 (B901), detects a high frequency pattern of write data (B902), and changes a current value of a high frequency pattern of write current corresponding to the high frequency pattern of write data (B903).

The amplifier IC 60 receives a low frequency determination signal from the outside, for example, the R/W channel 50 through the read data I/F 1402 (B904), and changes a current value of a low frequency pattern of a write current corresponding to the low frequency pattern of write data on the basis of the low frequency determination signal (B905).

The head amplifier IC 60 outputs a write current with the high frequency pattern of changed current value and the low frequency pattern of changed current value to the outside, for example, head 15 (B906).

In the present embodiment, the magnetic disk device 1 includes the R/W channel 50 and the head amplifier IC 60. The magnetic disk device 1 outputs write data from the R/W channel 50 to the head amplifier IC 60 through the write data I/F 1401. The magnetic disk device 1 detects a high frequency pattern of write data in the head amplifier IC 60 and changes a current value of a high frequency pattern of write current corresponding to the high frequency pattern of write data. Furthermore, the magnetic disk device 1 detects the low frequency pattern of write data in the R/W channel 50 and outputs a result of detection of the low frequency pattern as a low frequency determination signal from the R/W channel 50 to the head amplifier IC 60 through the read data I/F 1402 during write processing. The magnetic disk device 1 changes a current value of a low frequency pattern of a write current corresponding to a low frequency pattern of write data in the head amplifier IC 60 on the basis of the low frequency determination signal. Thus, the magnetic disk device 1 can change a current value of each of the high frequency pattern and the low frequency pattern of the write current without additional terminals and lines. Therefore, a magnetic disk device with improved reliability in data write can be achieved.

Now a magnetic disk device of a variation and another embodiment will be explained. In the description of the variation and another embodiment, the same elements are referred to by the same reference numbers and detailed description thereof will be omitted.
(Variation 1)

A magnetic disk device 1 of the variation 1 includes a low frequency signal circuit 720 structure of which is different from that of the first embodiment.

FIG. 10 is a schematic view showing an example of a circuit of a head amplifier IC 60 of the variation 1. In the variation 1, the low frequency signal circuit 720 includes, for example, a combination circuit 721. The combination circuit 721 is electrically connected to the write driver 730. The combination circuit 721 generates a low frequency determination signal on the basis of low frequency determination signals X2 and Y2 input through terminals T3 and T4 and outputs the generated low frequency determination signal to the write driver 730.

FIG. 11 is a table showing an example of a relationship between low frequency determination signals X2 and Y2 and processing of a low frequency pattern.

The head amplifier IC 60 controls a low frequency pattern of a write current on the basis of, for example, low frequency determination signals X2 and Y2 input from the R/W channel 50 as shown in table TB53. In the figure depicted, the head amplifier IC 60 boosts the low frequency pattern of the write current with a boost current Bst5 if a data pattern of the low frequency determination signal X2 is L and a data pattern of the low frequency determination signal Y2 is L. The head amplifier IC 60 boosts the low frequency pattern of the write current with a boost current Bst6 if the data pattern of the low frequency determination signal X2 is L and the data pattern of the low frequency determination signal Y2 is H. The head amplifier IC 60 suppresses the low frequency pattern of the write current if the low frequency determination signal X2 is H and the low frequency determination signal Y2 is L. The head amplifier IC 60 suppresses a current value of the low frequency pattern of the write current and boosts the low frequency pattern with a boost current Bst6 if the data pattern of the low frequency determination signal X2 is H and the data pattern of the low frequency determination signal Y2 is H.

FIG. 12 shows an example of processing of a low frequency pattern of a write current on the basis of the table of FIG. 11. Note that high frequency patterns of write data, delay data, and write current of FIG. 4 are shown in FIG. 4; however, detailed description thereof will be omitted.

FIG. 12(a) shows an example of a data pattern of write data input in the head amplifier IC 60, FIG. 12(b) shows an example of a data pattern of a low frequency determination signal X2 input from the R/W channel 50 to the head amplifier IC 60, and FIG. 12(c) shows an example of a data pattern of a low frequency determination signal Y2 input from the R/W channel 50 to the head amplifier IC 60, and FIG. 12(d) shows an example of a data pattern of delay data delayed in the head amplifier IC 60, and FIG. 12(e) shows an example of a data pattern of a write current changed on the basis of a low frequency control signal. In the write current of FIG. 12(e), a current H121 is greater than a current L121 and is less than a current H42. In FIG. 12(e), a current L121 is greater than a current L42. In FIG. 12(e), a current L122 is less than a current L42 and is greater than a current L82.

The head amplifier IC 60 generates a data pattern of delay data as shown in FIG. 12(d) by delaying the data pattern of write data of FIG. 12(a) input from the R/W channel 50 by a determination time, for example, by 1T. The head amplifier IC 60 checks the data pattern of the low frequency determination signal X2 of FIG. 12(b) and the data pattern of the low frequency determination signal Y2 of FIG. 12(c) input from the R/W channel 50 at a time when the low frequency pattern of delay data rises and falls. The head amplifier IC 60 changes a current value of a data pattern of the write current corresponding to the data pattern of delay data of FIG. 12(d) at a time when the low frequency pattern of write data rises or falls as shown in table TB53 of FIG. 11. The head amplifier IC 60 outputs a write current of FIG. 12(e) with changed current value of each of the high frequency pattern and low frequency pattern of the write current to the write head 15W.

In the example depicted, the head amplifier IC 60 checks the data pattern of the low frequency determination signals X2 and Y2 at time T43 when the data pattern P43 of delay data rises. Since the data pattern of the low frequency determination signal X2 is L and the data pattern of the low frequency determination signal Y2 is L, the head amplifier IC 60 supplies a boost current Bst3 to overlap with a current value H42 of a data pattern P403 of the write current at time T43 when the data pattern P403 of the write current corresponding to the data pattern P43 of delay data rises (overshoot) as shown in table TB53 of FIG. 11.

The head amplifier IC 60 checks the data pattern of the low frequency determination signals X2 and Y2 at time T45 when the data pattern P44 of delay data rises. Since the data pattern of the low frequency determination signal X2 is H and the data pattern of the low frequency determination signal Y2 is L, the head amplifier IC 60 suppresses a data pattern P404 of write current corresponding to the data pattern P44 of delay data as shown in table TB53 of FIG. 11.

The head amplifier IC 60 checks the data pattern of the low frequency determination signals X2 and Y2 at time T49 when the data pattern P46 of delay data falls. Since the data pattern of the low frequency determination signal X2 is L and the data pattern of the low frequency determination signal Y2 is H, the head amplifier IC 60 supplies a boost current Bst6 to overlap the current value L42 of the data pattern P406 of the write current at time T49 when the data pattern P406 of the write current corresponding to the data pattern P46 of delay data falls (undershoot) as shown in table TB53 of FIG. 11.

The head amplifier IC 60 checks the data pattern of the low frequency determination signals X2 and Y2 at time T412 when the data pattern P47 of delay data rises. Since the data pattern of the low frequency determination signal X2 is H and the data pattern of the low frequency determination signal Y2 is H, the head amplifier IC 60 suppresses a current value of a data pattern P407 of a write current and supplies a boost current Bst6 at time T412 when the data pattern P407 of the write current corresponding to the data pattern P47 of delay data rises as shown in the table of FIG. 11.

In the variation 1, the magnetic disk device 1 can suppress a current value of a low frequency pattern of a write current. Thus, the magnetic disk device 1 can change a current value of each of the high frequency pattern and the low frequency pattern of the write current without additional terminals and lines. Therefore, a magnetic disk device with improved reliability in data write can be achieved.

Second Embodiment

A magnetic disk device 1 of a second embodiment includes a high frequency signal circuit 710 structure of which is different from that of the magnetic disk device 1 of the aforementioned embodiment.

FIG. 13 is a schematic view showing an example of a circuit of a head amplifier IC 60 of the second embodiment.

In the second embodiment, the high frequency signal circuit 710 includes, for example, a buffer 711, rise timer 712, fall timer 714, AND circuits 716 and 718, and buffer 717.

The buffer 711 is electrically connected to AND circuit 716 and AND circuit 718. The buffer 711 outputs two write data transmitted in the differential method through terminals T1 and T2 as single write data to the AND circuits 716 and 718.

The rise timer 712 is electrically connected to AND circuit 716. The rise timer 712 outputs a measurement signal (hereinafter, first measurement signal (first signal)) which is turned on when a data pattern rises and is turned off when the data pattern falls to AND circuit 716. For example, the rise timer 712 starts a change of a voltage level of the first measurement signal when the data pattern rises. For example, the rise timer 712 chronologically changes the voltage level of the first measurement signal from L to H, and sets the voltage level constant after a certain period of time, for example, 1T. The rise timer 712 ends the change of the voltage level when the data pattern falls. For example, the rise timer 712 sets the voltage level to L.

The AND circuit 716 is electrically connected to the buffer 717. The AND circuit 716 compares the data pattern of write data input from the buffer 711 to the data pattern of the first measurement signal input from the rise timer 712, detects a high frequency pattern of write data from a result of the comparison, and outputs a high frequency determination signal (hereinafter, first high frequency determination signal) generated from the result to the buffer 717.

The fall timer 714 is electrically connected to AND circuit 718. The fall timer 714 outputs a measurement signal (hereinafter, second measurement signal) which is turned on when a signal rises and is turned off when the signal falls to AND circuit 718. For example, the fall timer 714 starts a change of a voltage level of the second measurement signal when the data pattern falls. For example, the fall timer 714 chronologically changes the voltage level of the second measurement signal from L to H, and sets the voltage level constant after a certain period of time, for example, lT. The fall timer 714 ends the change of the voltage level when the data pattern rises. For example, the fall timer 714 sets the voltage level to L.

The AND circuit 718 is electrically connected to the buffer 717. The AND circuit 718 compares the data pattern of write data input from the buffer 711 to the data pattern of the second measurement signal input from the fall timer 714, detects a high frequency pattern of write data from a result of the comparison, and outputs a high frequency determination signal (hereinafter, second high frequency determination signal) generated from the result to the buffer 717.

The buffer 717 is electrically connected to, for example, the write driver 730. The buffer 717 generates a high frequency control signal on the basis of the first high frequency determination signal and the second high frequency determination signal input from the AND circuits 716 and 718, and outputs the generated high frequency control signal to the write driver 730. A control signal SG10 is input in the buffer 717.

FIG. 14 shows an example of processing of a high frequency pattern of a write current of the second embodiment. FIG. 14(*a*) shows an example of a data pattern of write data input in the head amplifier IC 60, FIG. 14(*b*) shows an example of a data pattern of the first measurement signal of the rise timer, FIG. 4(*c*) shows an example of a data pattern of the second measurement signal of the fall timer, and FIG. 14(*d*) shows an example of the data pattern of the write current changed on the basis of the high frequency control signal. In FIGS. 4(*a*) to 4(*c*), the high frequency patterns of the write data and write current have a data bit interval of 1T. Furthermore, in FIGS. 4(*b*) and 4(*c*), the rise timer and the fall timer set the voltage level constant when the data bit interval exceeds 1T.

The head amplifier IC 60 compares the data pattern of write data of FIG. 14(*a*) and the data pattern of the first measurement signal of the rise timer of FIG. 14(*b*). If a result of the comparison does not show that the voltage level of the data pattern of the first measurement signal of the rise timer is constant, the head amplifier IC 60 determines that it is a high frequency pattern of write data, that is, 1T data pattern. Similarly, the head amplifier IC 60 compares the data pattern of the write data of FIG. 14(a) and the data pattern of the second measurement signal of the fall timer of FIG. 14(c). If a result of the comparison does not show that the voltage level of the data pattern of the second measurement signal of the fall timer is constant, the head amplifier IC 60 determines it is a high frequency pattern of write data. The head amplifier IC 60 boosts a high frequency pattern of a write current corresponding to a high frequency pattern of delay data delayed by a certain period of time, for example, 1T when the data pattern rises or falls. The head amplifier IC 60 outputs the write current with the boosted data pattern of FIG. 14(d) to the write head 15W.

In the example depicted, the head amplifier IC 60 determines that, since a voltage level of a data pattern P141 of the first measurement signal of the rise timer is not constant with respect to a data pattern P41 of write data which rises at time T40, the data pattern P41 is a high frequency pattern of write data. The head amplifier IC 60 supplies a boost current to a current value of a data pattern P401 of the write current at time T41 when the data pattern P401 of the write current corresponding to the data pattern P41 of write current rises (overshoot).

The head amplifier IC 60 determines that, since a voltage level of a data pattern P144 of the second measurement signal of the fall timer is not constant with respect to a data pattern P42 of write data which falls at time T41, the data pattern P42 is a high frequency pattern of write data. The head amplifier IC 60 supplies a boost current to a current value of a data pattern P402 of the write current at time T41 when the data pattern P402 of the write current corresponding to the data pattern P41 of write current falls (undershoot).

The head amplifier IC 60 determines that, since a voltage level of a data pattern P142 of the first measurement signal of the rise timer is constant with respect to a data pattern P43 of write data which rises at time T42, the data pattern P43 is not a high frequency pattern of write data. The head amplifier IC 60 outputs a data pattern 403 of a write current corresponding to the data pattern P43 of write data.

The head amplifier IC 60 determines that, since a voltage level of a data pattern P145 of the second measurement signal of the fall timer is constant with respect to a data pattern P44 of write data which falls at time T44, the data pattern P44 is not a high frequency pattern of write data. The head amplifier IC 60 outputs a data pattern 404 of a write current corresponding to the data pattern P44 of write data.

The head amplifier IC 60 determines that, since a voltage level of a data pattern P143 of the first measurement signal of the rise timer is not constant with respect to a data pattern P45 of write data which rises at time T47, the data pattern P45 is a high frequency pattern of write data. The head amplifier IC 60 supplies a boost current to a current value of a data pattern P405 of the write current at time T48 when the data pattern P405 of the write current corresponding to the data pattern P45 of write current rises (overshoot).

In the second embodiment, the magnetic disk device 1 includes the rise timer 712 and the fall timer 714 in the head amplifier IC 60. The magnetic disk device 1, in the head amplifier IC 60, compares the first measurement signal and the second measurement signal outputs from the rise timer 712 and the fall timer 714, respectively, and detects a high frequency pattern from a result of the comparison. Thus, the magnetic disk device 1 can change a current value of each of the high frequency pattern and the low frequency pattern of the write current without additional terminals and lines. Therefore, a magnetic disk device with improved reliability in data write can be achieved.

Note that the magnetic disk device 1 may be structured to include a timer 713 with a rise timer and a fall timer instead of the delay circuit 713 of FIG. 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk;
a head configured to write data to the disk; and
an integrated circuit configured to acquire a detection signal indicative of a first pattern of a first frequency of write data, change a first current of a second pattern of a write current corresponding to the first pattern on the basis of the detection signal, detect a third pattern of a second frequency which is greater than the first frequency from the write data, change a second current of a fourth pattern of the write current corresponding to the third pattern, and output the write current with the changed first current and the changed second current to the head.

2. The magnetic disk device of claim 1, further comprising:
a first circuit configured to transmit the write data to the integrated circuit; and
a second circuit configured to transmit read data to the outside of the integrated circuit when reading data from the disk and transmit the detection signal to the integrated circuit when writing data to the disk.

3. The magnetic disk device of claim 1, wherein the integrated circuit compares a data pattern of write data to a data pattern of delay data which is the write data delayed by an interval of the third pattern and detects the third pattern from a result of the comparison.

4. The magnetic disk device of claim 1, wherein the integrated circuit detects the third pattern on the basis of a first signal which rises when the data pattern of write data rises and falls when the data pattern of write data falls.

5. The magnetic disk device of claim 1, wherein the integrated circuit detects the third pattern on the basis of a second signal which falls when the data pattern of write data falls and rises when the data pattern of write data rises.

6. The magnetic disk device of claim 1, wherein the integrated circuit supplies a third current to overlap with the second current when the fourth pattern rises or falls.

7. The magnetic disk device of claim 6, wherein the integrated circuit supplies, on the basis of the detection signal, a fourth current to overlap with the first current when the second pattern rises or falls.

8. The magnetic disk device of claim 6, wherein the integrated circuit increases the first current on the basis of the detection signal.

9. The magnetic disk device of claim 7, wherein the integrated circuit suppresses the first current on the basis of the detection signal.

10. The magnetic disk device of claim 1, wherein the integrate circuit compares the data pattern of write data to a measurement signal having a voltage level which starts to rise from L to H when the data pattern of write data rises or falls and becomes constant after a first time, and detects the third pattern from a result of the comparison.

11. The magnetic disk device of claim 1, wherein a data bit interval of the third pattern is 1T.

12. A magnetic disk device comprising:
a disk;
a head configured to write data to the disk;
a controller configured to detect a first pattern of a first frequency from write data and generate a detection signal indicative of the detected first pattern; and
an integrated circuit configured to acquire the detection signal from the controller, change a first current of a second pattern of a write current corresponding to the first pattern on the basis of the detection signal, detect a third pattern of a second frequency which us greater than the first frequency from the write data, change a second current of a fourth pattern of the write current corresponding to the third pattern, and output the write current with the changed first current and the changed second current to the head.

13. The magnetic disk device of claim 12, further comprising:
a first circuit configured to transmit the write data from the controller to the integrated circuit; and
a second circuit configured to transmit read data from the integrated circuit to the controller when reading data from the disk and transmit the detection signal from the controller to the integrated circuit when writing data to the disk.

14. A write processing method applied to a magnetic disk device including a disk and a head configured to write data to the disk, the method comprising:
acquiring a detection signal indicative of a first pattern of a first frequency of write data;
changing a first current of a second pattern of a write current corresponding to the first pattern on the basis of the detection signal;
detecting a third pattern of a second frequency which is greater than the first frequency from the write data and changing a second current of a fourth pattern of the write current corresponding to the third pattern; and
outputting the write current with the changed first current and the changed second current to the head.

15. The method of claim 14, further comprising:
comparing a data pattern of write data to a data pattern of delay data which is the write data delayed by an interval of the third pattern; and
detecting the third pattern from a result of the comparison.

16. The method of claim 14, further comprising:
detecting the third pattern on the basis of a first signal which rises when the data pattern of write data rises and falls when the data pattern of write data falls.

17. The method of claim 14, further comprising:
detecting the third pattern on the basis of a second signal which falls when the data pattern of write data falls and rises when the data pattern of write data rises.

18. The method of claim 14, further comprising:
supplying a third current to overlap with the second current when the fourth pattern rises or falls.

19. The method of claim 18, further comprising:
supplying, on the basis of the detection signal, a fourth current to overlap with the first current when the second pattern rises or falls.

20. The method of claim 18, further comprising:
increasing the first current on the basis of the detection signal.

\* \* \* \* \*